United States Patent [19]

Van Doorn et al.

[11] Patent Number: 4,747,251

[45] Date of Patent: May 31, 1988

[54] PORTABLE BIN TRANSFER SYSTEM

[75] Inventors: Donald W. Van Doorn; James B. Hawkins; Francis W. Carpenter, III; Wilbur G. Hudson; Tommy W. Webb; William D. Beeland, all of Columbus, Ga.

[73] Assignee: Lummus Industries, Inc., Columbus, Ga.

[21] Appl. No.: 902,607

[22] Filed: Sep. 2, 1986

Related U.S. Application Data

[62] Division of Ser. No. 788,623, Oct. 17, 1985, Pat. No. 4,617,862.

[51] Int. Cl.[4] ............ B65G 57/00

[52] U.S. Cl. ............ 53/250; 53/249; 414/70

[58] Field of Search ............ 414/70, 71; 53/250, 53/249, 251, 252, 438, 529, 527

[56] References Cited

U.S. PATENT DOCUMENTS

| | | | |
|---|---|---|---|
| 3,517,831 | 6/1970 | Hahn | 414/71 X |
| 3,693,321 | 9/1972 | Nilsson | 414/71 X |
| 3,939,994 | 2/1976 | Suzzi | 414/42 |
| 4,043,097 | 8/1977 | Ishida et al. | 414/42 X |
| 4,372,101 | 2/1983 | Fleissner | 53/435 |

FOREIGN PATENT DOCUMENTS 48303 6/1966 Fed. Rep. of Germany .

*Primary Examiner*—James F. Coan

*Attorney, Agent, or Firm*—Jennings, Carter, Thompson & Veal

[57] ABSTRACT

A bin transport system for a fiber baling apparatus utilizes a plurality of portable upwardly opening bins which have openable bottoms. The bins are transported from a plurality of fiber filling stations to a single compression staton by a four-part transport means utilizing a dual carriage cross shuttle which moves the portable bins to and from positions adjacent the filling stations and the compression station. A pair of dedicated bin transporters are utilized to transport the bins such that one transporter delivers full bins from the filling stations to a position adjacent the compression station while the other transporter delivers empty bins from the compression station to a position adjacent each filling station.

10 Claims, 5 Drawing Sheets

PORTABLE BIN TRANSFER SYSTEM

This is a division of application Ser. No. 788,623 filed Oct. 17, 1985, now U.S. Pat. No. 4,617,862.

BACKGROUND OF THE INVENTION

This invention relates to a textile fiber baling system and more particularly to a system which uses a plurality of portable bins having an open top into which textile fiber is introduced and a movable bottom by which such fiber is removed for baling with the portable bin. More particularly the present invention relates to apparatus for transporting such a plurality of portable bins between a filling station where fiber is introduced into the bin and a compression station where the fiber is compressed into bales.

Until recently, balers used for baling fibers in man-made fiber plants have been dedicated to a single process line of fiber production. In a typical man-made fiber plant, several of these process lines are placed side by side. Thus, in the typical existing baling system, a number of balers would be placed side by side in a row. In such systems, the bale is wrapped and strapped in the baling process by manual and semiautomatic means. Recently, however, automatic wrapping and tying systems have been introduced. These automatic wrapping and tying systems are complex and add considerable cost to the baling systems. Furthermore, higher density fiber compaction is being demanded to reduce the cost of storing and transporting the finished bales and to reduce the expansion of the fibers when the ties are removed. The higher densities require considerably larger hydraulic compression systems which also add to the cost of final compaction in the baling systems.

Therefore, there is a demand for baling systems that can receive fiber from a plurality of process lines, each producing fibers with different characteristics, and transport these different fibers to a central final compaction station where the fibers are made into bales and automatically wrapped and tied. The fibers from each of the process lines must be segregated. The baling system must prevent contamination of fibers from one process line with fibers from another process line.

Similar problems associated with conventional waste fiber pneumatic systems coupled with horizontal balers were noted in U.S. Pat. No. 4,463,669 entitled SYSTEM FOR BALING TEXTILE WASTE FROM A PLURALITY OF SOURCES owned by the common assignee with the instant application. U.S. Pat. No. 4,463,669 discloses a system which used a baling station and at least one fiber filling station wherein a portable bin having an open top was filed with the waste fibers. Each baling station receives portable bins from a plurality of filling stations with each filling station receiving its waste fibers from a designated source. The portable bins are movable along a single track connecting the baling station with its filling stations. Therefore a single carriage is available for moving the portable bin between the stations. While the waste fiber baling system of the aforementioned U.S. patent represents a vast improvement over the prior art in this field in terms of personnel safety and economy, it leaves something to be desired in terms of its efficiency and time management properties.

SUMMARY OF THE INVENTION

It is an object of the present invention to provide greater economy in the baling process by reducing the amount of floor space and machinery required to bale segregated fibers from a plurality of fiber processing lines.

Another object of the invention is the efficient utilization of the hydraulic compression system used to form high density bales.

The present invention utilizes a number of separate fiber processing lines which feed fiber to a plurality of filling stations arranged along a straight or curved line and a compression station also located along this line. Each filling station in the system services a discreet processing line and uses at least two receiving bins which are transported to the compression station and are returned to the filling station by a four-part transport arrangement. At each filling station and compression station there is a cross transfer shuttle which reciprocates perpendicular to a line through the center of the filling stations and the compression station. Each cross shuttle is capable of transporting one or two bins at a time transversely of this line to and from a pair of bin transporters that run parallel to the line through the center of the filling stations and the compression station. These bin transporters are approximately equidistant from the filling stations center line and are respectively located on either side of the center line through the filling stations. The transporter on one side of the filling stations moves full bins from the cross shuttle located at each filling station to a cross shuttle located at the compression station. The other transporter moves empty bins from the cross shuttle at the compression station to the cross shuttle located at the appropriate filling station. Each cross shuttle is capable of simultaneously moving a portable bin from a particular station to the appropriate longitudinal transporter while moving a second portable bin from the other longitudinal transporter into the particular station. This system uses only slightly greater floor space than does the aforementioned waste fiber system of U.S. Pat. No. 4,463,669; however since the empty bins and full bins travel on separate dedicated transport means the compression station is able to service a larger number of filling stations far more efficiently than with a single transport means. Inasmuch as the cross shuttle can handle both the incoming and outgoing bin at the same time and the dedicated transporter can complete its cycle independently on the other dedicated transporter, there is very little necessity for dead time in any stage of the operation.

BRIEF DESCRIPTION OF THE DRAWINGS

Apparatus embodying features of our invention is illustrated in the accompanying drawings forming a part of this application in which.

DESCRIPTION OF A PREFERRED EMBODIMENT

Figure 1:
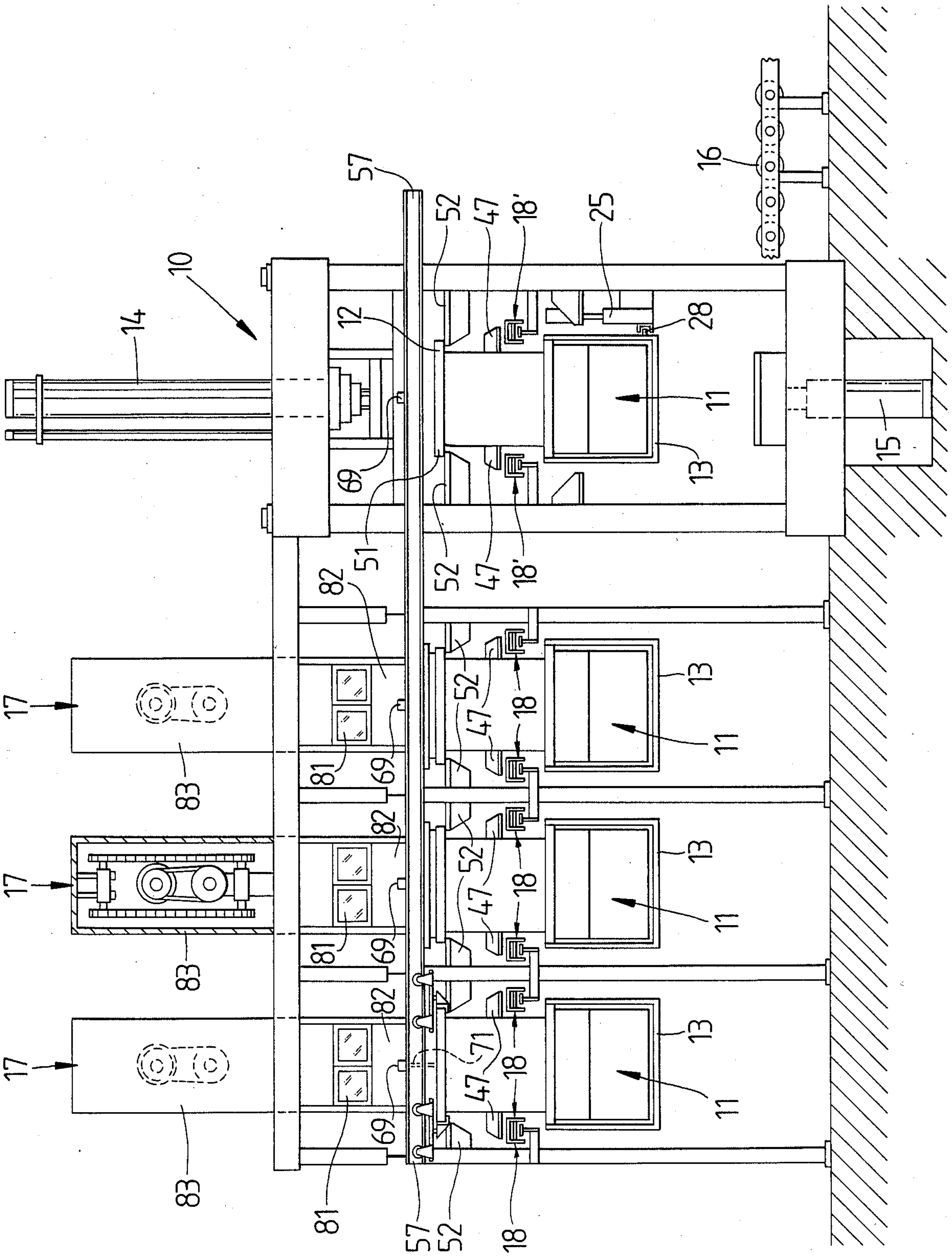
FIG. 1 is an elevational view showing our improved bin transport apparatus in conjunction with a plurality of filling stations and a compression station.
Figure 2:
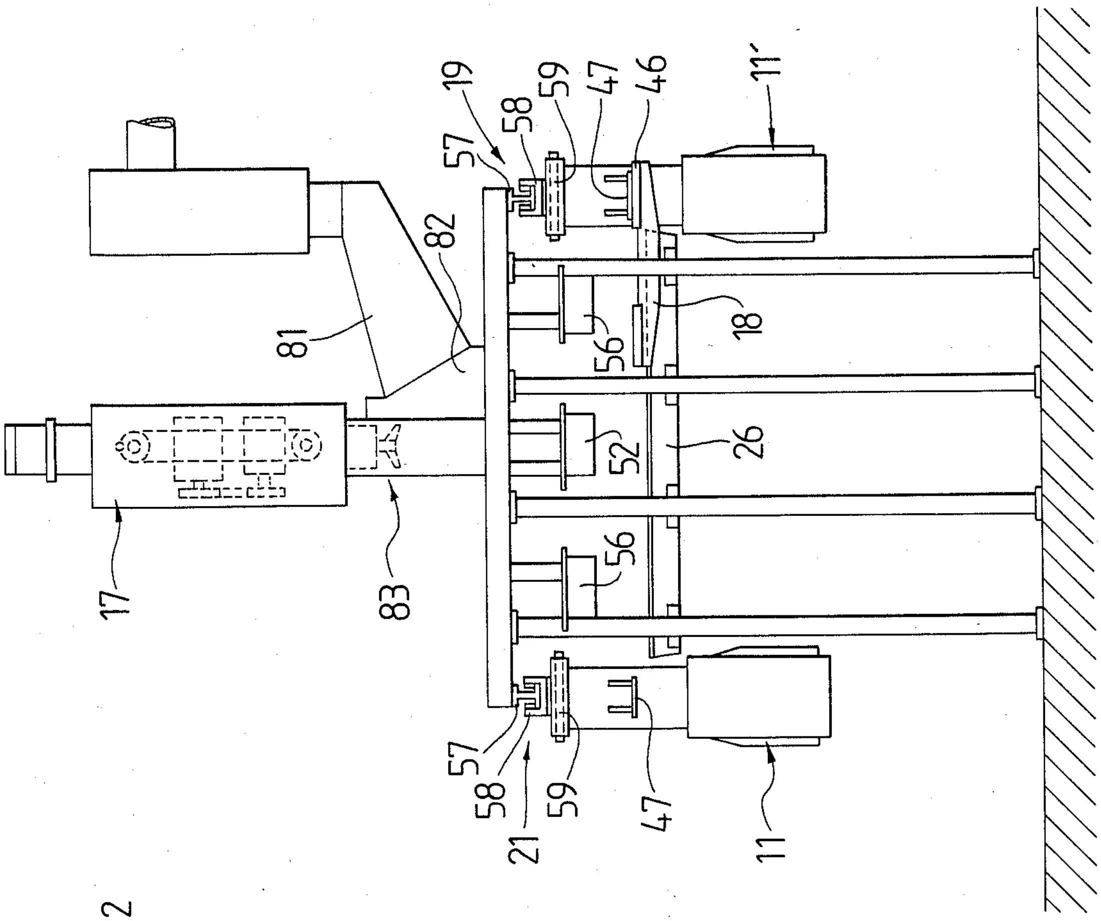
FIG. 2 is an end view of the apparatus shown in FIG. 1.

Referring to the drawings, our invention is shown in conjunction with a downpacking compression station 10 for baling fiber into bales of fiber for subsequent processing. The compression station 10 is similar in its operation to the compression station disclosed in U.S. Pat. No. 3,796,150 which is incorporated herein by reference. The invention uses a vertically oriented ram 14 which descends into a portable bin 11 which has an open top 12 and clam-shell like doors 13 for a bottom. Fibers within the bin 11 are compressed into a bale between the upper ram 14 and a lower ram 15 in accordance with the teaching of the aforementioned U.S. Pat. No. 3,796,150. The clam-shell like doors 13 are opened in the compression station 10 by a linkage 20 carried on each bin 11 and operatively connected to an actuating cylinder 25 affixed to the compression station in position to engage a lift block assembly 28 which in turn is operatively connected to the linkage 20. A roller conveyor 16 is used to remove the bale from the area of the compression station 10. The compression station 10 is shown in conjunction with a plurality of fiber filling stations 17 each of which receives textile fiber from a designated source in the same manner as the fiber filling stations disclosed in U.S. Pat. No. 4,463,669, also incorporated herein by reference. The filling stations 17 feed the textile fibers into the top of a portable bin 11 located at each fiber filling station 17. Each filling station 17 has a separate fiber feeder 81 which introduces the fibers to a charging box or plenum 82 above the open top of the portable bin 11. The fiber feeder 81 is offset from the vertical to accommodate a tramper assembly 83 which compacts fiber into the portable bin 11. Unlike the previous system disclosed in the U.S. Pat. No. 4,463,669, the present system uses more than one portable bin 11 in conjunction with each fiber filling station 17. That is to say, in the previous system each fiber feed station had a portable bin associated therewith which was moved from the designated feed station to and from the compression station so that for each feed station there was a single portable bin and the total number of portable bins in the system was equal to the total number of feed stations. In the present system the number of portable bins 11 is equal to or greater than the total number of fiber filling stations 17 plus the compression station 10; thus every station, whether it be a feed station or a compression station, has a portable bin 11 within it for the majority of the time that the system is operating including the time during which the bins are transported from one station to another. Therefore, it is preferred that at least one additional portable bin 11 for each station 10 is placed within the system so that the additional bin 11 may be introduced into one of the stations 10 or 17 simultaneously with the removal of a bin from the station.

Figure 3:
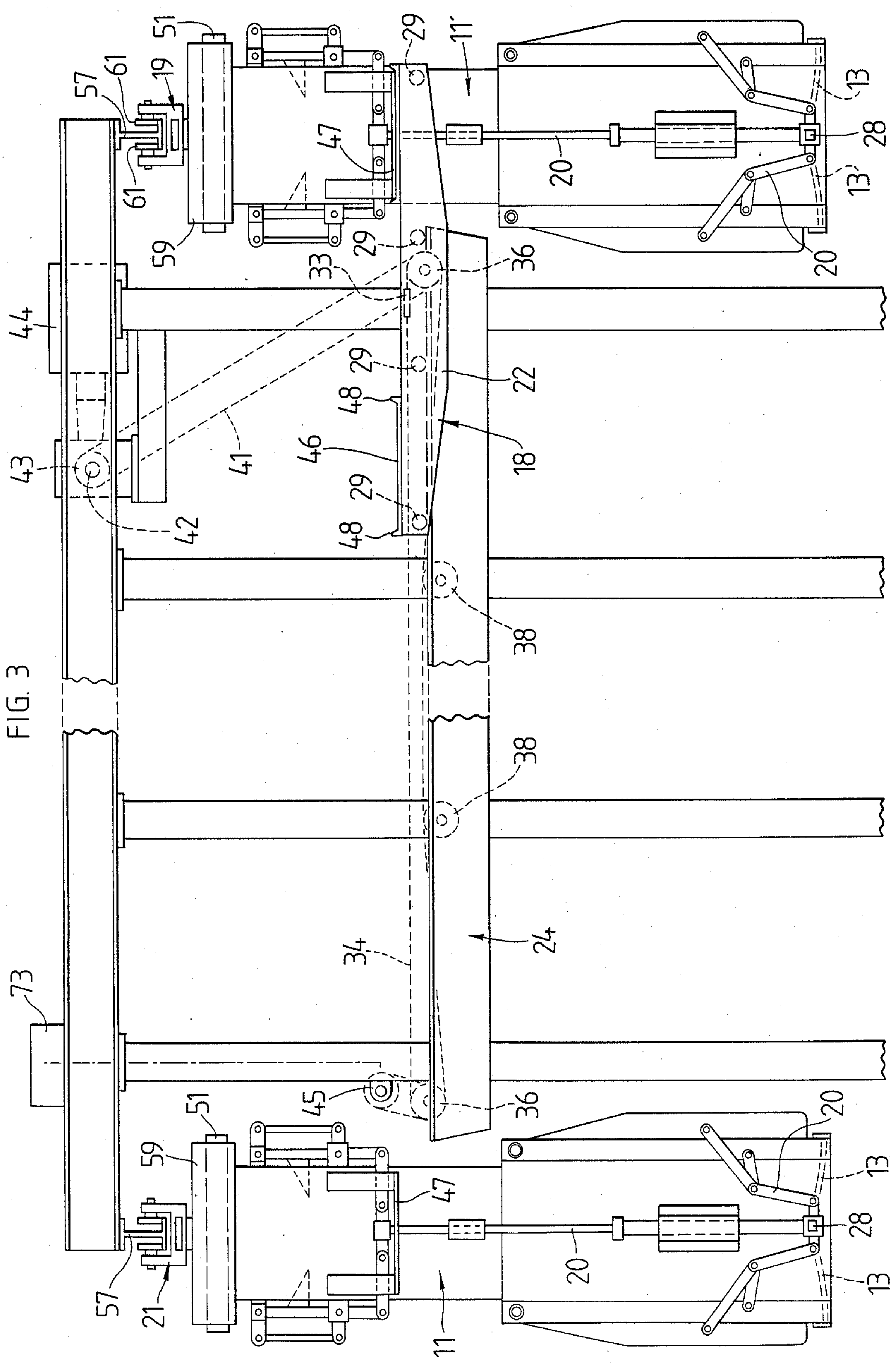
FIG. 3 is an elevational view of the transporter system taken adjacent a fiber filling station showing the cross shuttle transporter and its drive means.

The fiber filling stations 17 and the compression station 10 are all located along a straight or curved line which passes through the center of each station. At each filling station 17 and compression station 10 there is a cross transfer shuttle 18 which operates in a reciprocating motion crosswise to the line through the center of the station. Each of these cross transfer shuttles 18 is capable of transporting one or two bins at a tine transversely of this line through the filling stations 17 and a compression station 10. Two bin transporters 19 and 21 run parallel to the line through the center of the stations and are approximately equally distant from this center line on either side of the center line through the stations, as shown in FIG. 3. The bin transporter 19 is a full bin transporter and is dedicated to receiving full bins 11′ from the cross shuttles 18 at each filling station, as shown in FIG. 3. The full bin transporter 19 then carries the full bin 11′ to a point adjacent the compression station 10 for transfer to the cross shuttle 18′ which services the compression station 10. On the opposite side of the stations is the empty bin transporter 21 which is a dedicated transporter which receives empty bins 11 from the cross transfer shuttle 18 servicing the compression station 10 and moves them to a point adjacent one of the filling stations 17 for transfer to the cross transfer shuttle 18 servicing the particular filling station 17.

The cross transfer shuttles 18 will be described with reference to FIGS. 1 and 3–6. Each cross transfer shuttle 18 utilizes two carriages 22 and 23 which are supported on separate parallel T-shaped tracks 24 and 26. The T-shaped tracks 24 and 26 extend perpendicular to the bin transporters 19 and 21 and pass on each side of the bins 11 in each station. Inasmuch as the bins 11 extend downwardly beneath these tracks and upwardly above these tracks there is no cross connection between the carriages 22 and 23. Each of the carriages 22 and 23 has elongated flanges 27 which extend downwardly alongside the top of its T-shaped track 24 or 26, as the case may be, and carries a plurality of transversely extending axles each of which in turn carries a cam roller 29. As may be seen in FIGS. 4 and 5 each cam roller 29 rests atop the T-shaped track 24 or 26, as the case may be, and is maintained in a centered position on its track by a pair of edge rollers 31 which are carried by the flanges 27. A pair of retaining rollers 32 are positioned subjacent the cam roller 29 and the top of its track such that the T portion of the track is confined intermediate the cam roller 29 and the retaining rollers 32 whereby each carriage 22 or 23 is constrained to travel along its track.

Figure 4:
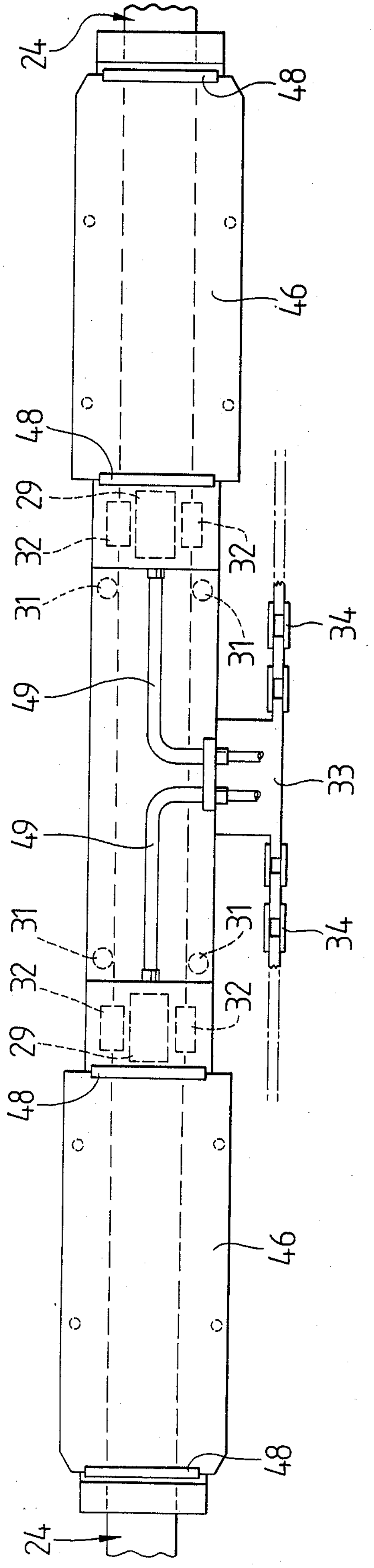
FIG. 4 is a partial plan view of the cross shuttle conveyor shown in FIG. 2.
Figure 5:
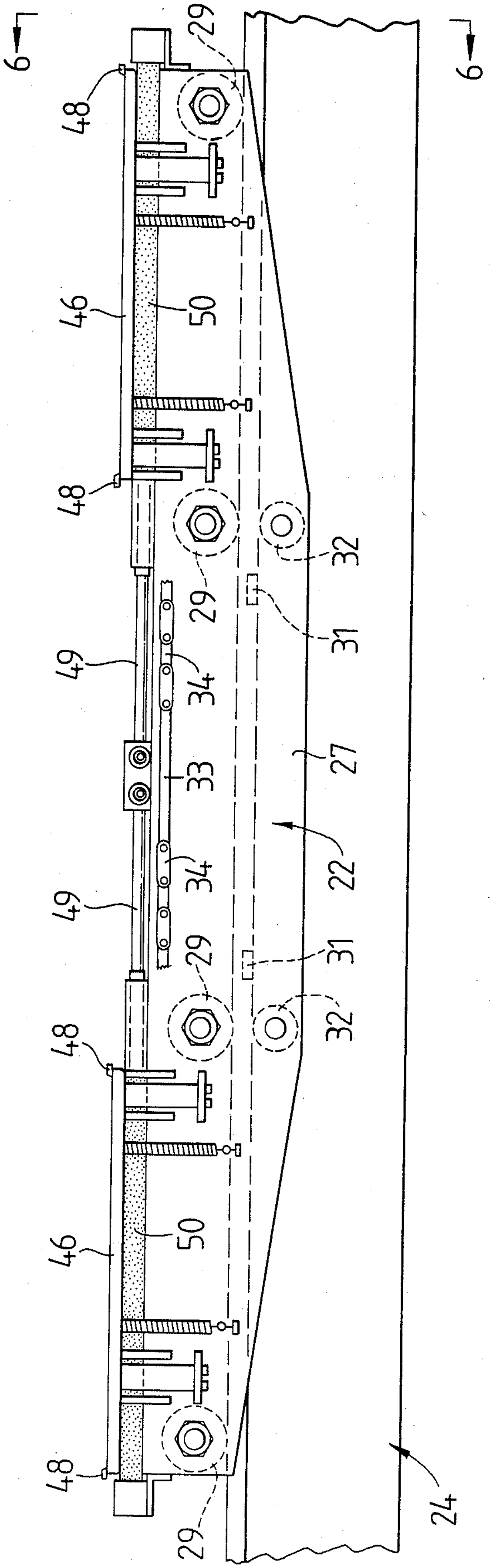
FIG. 5 is an elevational view of the cross conveyor carriage taken along the longitudinal axis and partly broken away.
Figure 6:
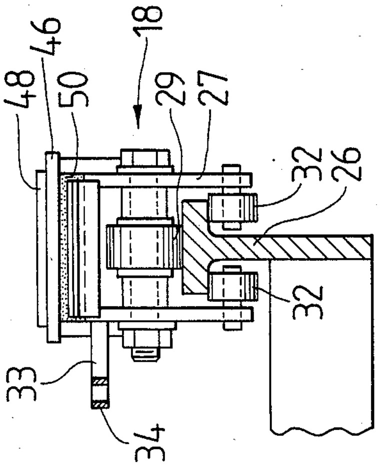
FIG. 6 is a partial sectional view of the cross shuttle conveyor frame taken along line 6—6 of FIG. 5.
Figure 8:
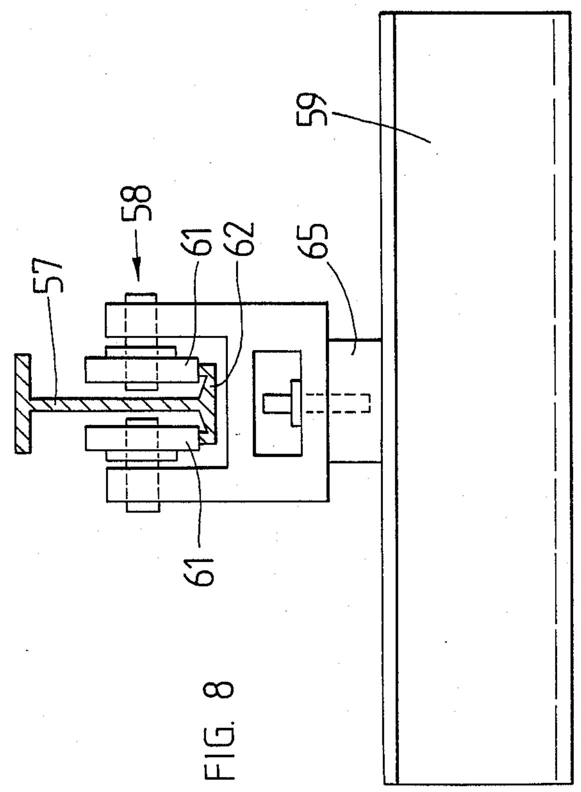
Figure 7:
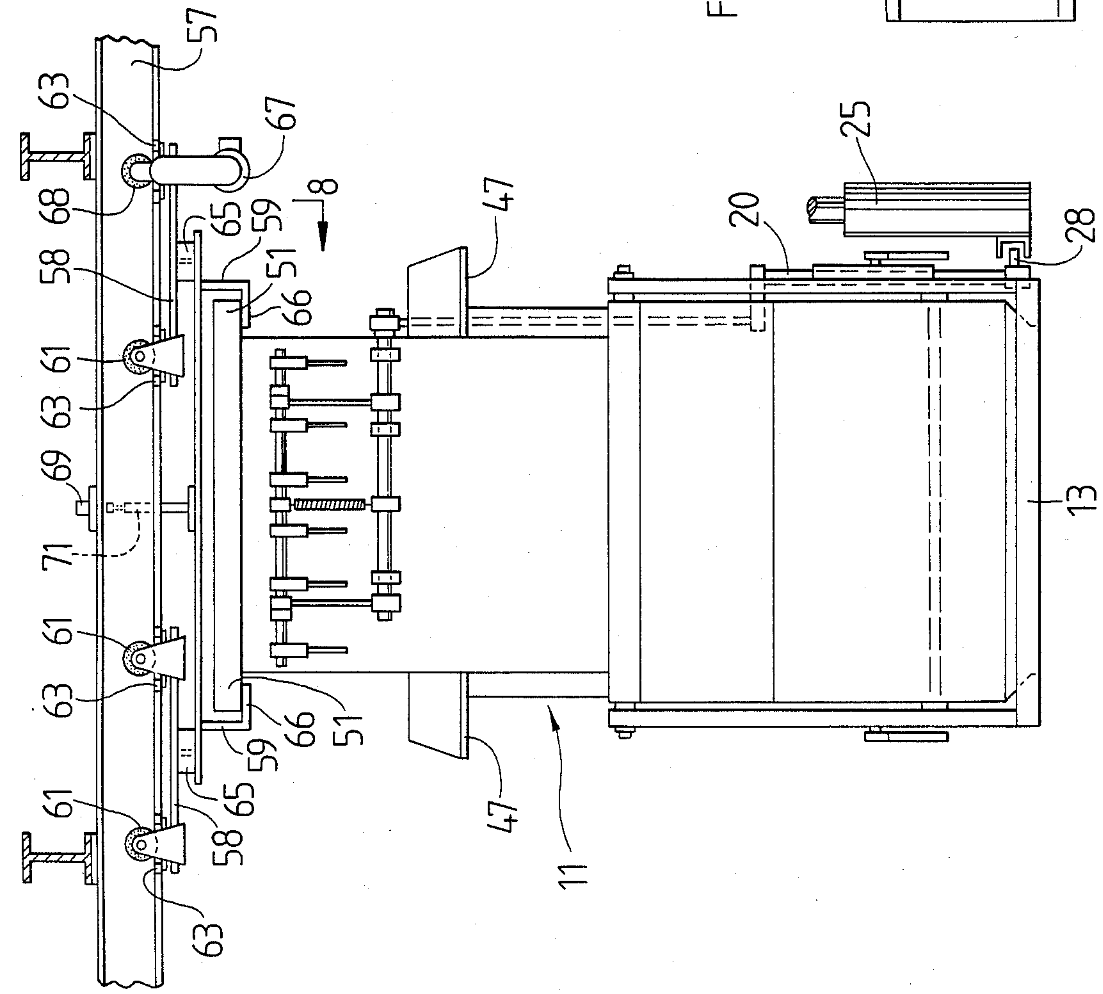
FIG. 7 is an elevational view, partly in section, showing the dedicated transport mechanism; and, FIG. 8 is an enlarged cross sectional view along line 8—8 of FIG. 7.

Extending laterally from near the center of each carriage 22 or 23, as the case may be, is a chain coupler 33, as shown in FIGS. 3–5, which is attached to a horizontally disposed drive chain 34 that passes around sprockets 36 adjacent each end of tis track 24 or 26, as the case may be. Chain supports and idlers 38 are located at predetermined intervals along each horizontal drive chain 34 as is conventional. The upper runs of the horizontal drive chains 34 are connected to a chain coupler 33 to provide motive force to each of the carriages 22 or 23. The sprockets 36 are driven by a drive chain 41 which in turn is driven by an overhead cross shaft 42 which carries drive sprockets 43 on each end thereof. The drive sprockets 43 are connected to the carriages 22 and 23 on each track associated with a particular station so that the drive chains 41 and horizontal drive chain 34 of both carriages 22 and 23 in a cross transfer shuttle 18 move synchronously and concomitantly on their parallel tracks 24 and 26. The shaft 42 is driven by a motor 44. A pulse counter 45 at one end of the drive chain 34 of one of the carriages counts the revolutions of an associated sprocket 36 and outputs a signal to a controller unit 73 to indicate the position of the shuttle.

With reference to FIGS. 4 and 5, at each end of each carriage 22 and 23 there is a lift pad 46, as shown in FIG. 3, which is designed to cooperate with an outwardly extending flange 47 located on each side of portable bin 11. Each lift pad 46 has an upturned protrusion 48 at each end thereof and is pneumatically displaced by a pneumatic bladder 50 powered from a source of pneumatic pressure by pneumatic hoses 49. At 100 psi pressurization each pad exerts 9,000 pounds of lift and has a vertical range of travel of one and one-half inches. As may be seen in FIG. 1, the upper portion of each portable bin has a laterally extending lip 51 which rests on supports 52 in each compression station and baling station. When the lift pads 46 are raised to their full up position the lip 51 is lifted from the support 52 and the weight of the bin is borne by the two carriages 22 and 23. The output of the pulse counter 45 is used to monitor the position of the cross shuttle 18 and to position the lift pad 46 beneath the bin 11 within the filling station 17 or compression station 10. Intermediate the filling or compression station and the bin transporter and along the travel of the cross shuttle 18 are two more sets of supports 56 from which the bin 11 may be supported.

Each bin transporter 19 and 21 is an independent monorail system including a rail 57 and a carrier 58. The carrier 58 includes a bracket-shaped frame 59 which is suspended beneath the monorail and is supported by a plurality of monorail rollers 61 which travel on a laterally extending rail flange 62 and are positioned thereon by a plurality of edge rollers 63. The monorail carriers 58 are connected to the frame 59 by pivotally mounted frame suspensions 65 which allow the front and rear rollers 61 of the carriers 58 to turn independently whereby the carriers 58 may travel on a curved track without bending. The bracket-shaped frame 59 has a longitudinal dimension greater than the width of the portable bin 11 and receives the lips 51 therein. This frame 59 is laterally opening and has a set of inwardly facing extensions 66 on which the bin lip 51 may be supported. A DC motor 67 and an associated drive wheel 68 are attached at one end of the carrier and provide motive force to the carrier along the rail 57. Atop the rail 57 are a plurality of proximity switches 69 which are used to indicate the position of the carrier adjacent one of the cross shuttles 18. These proximity switches 69 are actuated by a rod-like actuator 71 mounted on the frame 59. Each end of the rail 57 terminates in a stop, not shown, to prevent unwanted travel by the carrier.

The motor 44 for the cross shuttle 18, the pressure source for the pneumatic hoses, the motor 67 for the bin transporters and the proximity switches 69, as well as the hydraulic rams and fiber feed systems, are controlled by and/or provide input to a microprocessor control unit 73, such as a SY/MAX 500 Programmable Controller, which directs the positioning of the cross shuttle 18 and the bin transporters 19 and 21 such that each bin 11 may be transported in the following cycle.

The full bin transporter 19 receives a full bin 11' from the cross shuttle 18 adjacent a filling station 17. That is, the cross shuttle 18 with its lift pad supporting the full bin 11' moves to its extreme outboard position whereupon the pulse counter sends a signal to the control unit 73 to indicate the proper placement of the bin beneath the monorail for delivery thereto. Prior to this occurrence, the control unit 73 directed the full bin transporter 19 to position on the rail 57 outwardly from the cross shuttle 18 such that the movement of the cross shuttle to the indicated position delivers the lips 51 of the bin into the bracket-shaped frame 59 of the monorail carrier 58. Positioning of the carrier 58 and the cross shuttle 18 is accomplished under the direction of the control unit 73. When the control unit 73 determines that the bin has been placed properly within the bracket-shaped frame, the lift pad 46 of the cross shuttle 18 is lowered and the entire weight of the full bin is supported by the inwardly facing extensions 66 of the frame 59. The full bin transporter 19 carries the full bin 11' to a point adjacent the compression station 10 as indicated by a proximity switch 69 located along the rail 57 at the compression station. The compression station cross shuttle 18' moves to its outermost point of travel to place its lifting pad 46 beneath the flanges 47 of the full bin 11'. When the control unit 73 receives the signal indicating that the pads 46 are so positioned, the pads on each carriage 22 and 23 are pneumatically raised one and one-half inches to lift the full bin 11' within the bracket-shaped frame 59 such that the full weight of the bin 11' is supported by the cross shuttle 18'. The cross shuttle 18' then moves the full bin 11' toward the compression station 10. Sensors, not shown, on the compression station 10 signal that the bin 11 within the compression station 10 is empty and ready to be moved out of the compression station, causing the set of pads 46 on the other end of the carriages 22 and 23 to be pneumatically raised thereby lifting the empty bin 11 from the fixed support 52 in the compression station 10. The cross shuttle 18' will then move until the full bin 11' is properly aligned in the compression station 10. The set of pads 46 supporting the full bin 11' will then descend releasing the full bin 11' onto the fixed supports 52 in the compression station 10. The cross shuttle carriage now has the empty bin resting on its remaining set of pads 46 for delivery to the empty bin transporter 21. The empty bin transporter frame 59 is positioned adjacent the end of the compression station cross shuttle 18' and the lip 51 on the bin is inserted into the bracket-like frame 59 in the same manner as previously described whereupon the pads 46 of the carrier descend so that the empty bin 11 is supported by the extensions 66. The motor 67 is then energized to transport the monorail carrier 58 and empty bin 11 to a position adjacent one of the filling stations 17 as directed by the control unit 73. At the filling station 17 the bin awaits a cross shuttle 18 which will engage and lift the bin 11 from the monorail carrier 58 and position the empty bin within the filling station 17 to replace a bin which has been previously filled. It should be noted that the empty bin may be moved from the empty bin transporter 21 simultaneously with the movement of the full bin from the filling station 17 to the full bin transporter 19.

If the empty bin transporter 21 aligns itself with the compression station 10 before the full bin transporter 19 aligns itself with the compression station 10, the cross shuttle 18' will move toward the empty bin monorail until it aligns the empty bin 11 taken from the compression station 10 with the carrier 58 and lower the bin 11 releasing the bin 11 to the carrier 58 on the empty bin transporter 21. If however the cross shuttle has lifted the empty bin from the compression station 10 before the empty bin transporter 21 arrives and the full bin transporter 19 aligns with the compression station 10 then the cross shuttle 18' will first position the empty bin over a set of fixed supports 56 intermediate the compression station 19 and the empty bin transporter 21. The cross shuttle 18' will then move toward the full bin transporter 19 and engage the full bin 11'. The full bin may then be positioned within the compression station 19 or on a second set of supports 56 intermediate the full bin transporter 19 and the compression station 10. When the empty bin transport aligns itself with the compression station cross shuttle, the empty bin is retrieved from the intermediate supports 56 and the sequence continues.

While we have shown our invention in but one form, it will be obvious to those skilled in the art that it is not so limited, but is susceptible of various changes and modifications without departing from the spirit thereof.

What we claim is:

1. An apparatus for moving bins into and out of a station wherein said bins are filled or emptied such that said bins may be transported to a remote location comprising in combination:

(a) a driven shuttle movable selectively through said station and outwardly thereof to bin receiving and discharging positions, said shuttle having a pair of synchronously driven frame members spaced apart for receiving said bins therebetween;

(b) controllable lift means mounted as cooperative pairs on the ends of said frame members for lifting and supporting said bins intermediate said frame members in said station and lowering said bins for removal to said remote location, such that an empty bin and a full bin may be simultaneously supported at the ends of said frame members and moved by said shuttle to and from said station; and (c) means for supporting said shuttle beneath said spaced apart frame members.

2. Apparatus as defined in claim 1 wherein said means for supporting said shuttle is a pair of parallel tracks and said shuttle comprises:

(a) a pair of elongated frame members supporting said lift means;

(b) a plurality of support rollers supporting said frame members on top of said tracks; and (c) drive means operatively connected to said frame members for concomitantly urging said members along said tracks.

3. Apparatus as defined in claim 2 wherein said frame members are movable along said tracks to position said lifting means outwardly of the ends of said tracks such that said bins may be removed for transport to said remote location.

4. Apparatus as defined in claim 1 further comprising means for controlling the movement of said shuttle through said station for the transfer of bins therein.

5. Apparatus as defined in claim 1 further comprising support means proximal said shuttle and said station for receiving one of said bins from said shuttle while said shuttle transfers another bin into or out of said station.

6. Apparatus as defined in claim 1 further comprising means for delivering bins to a first position outwardly of said station for movement by said shuttle into said station and for removing bins placed by said shuttle at a second position outwardly of said station and opposite said first position to a remote location.

7. Apparatus as defined in claim 1 wherein said controllable lift means comprises:

(a) pneumatic pressure lines carried by said shuttle and adapted for connection to a source of pneumatic pressure; and (b) a pair of lift pads carried at each end of said frame members and movable upwardly responsive to pneumatic pressure in said line to engage said bin on opposite sides thereof.

8. Apparatus as defined in claim 2 wherein said drive means comprises:

(a) a drive motor; and (b) a chain drive operatively connecting said motor in driving relation with said frame for moving said frame along said track responsive to said motor.

9. Apparatus for moving a bin into or out of a station wherein the bins may be filled or emptied comprising:

(a) a track mounted shuttle movable through said station having first and second frame members each being independently mounted for motion along said track through said station on opposite sides of said bin and drive means for synchronously and concomitantly moving said frame member along said track;

(b) pneumatic lift pads operatively positioned in each end of each of said frame members for selectively lifting and supporting a bin intermediate either end of said frame members for transport into or out of said station; and (c) sensing means for determining the position of the shuttle relative to said station.

10. Apparatus as defined in claim 9 further comprising support means proximal said shuttle and said station for receiving one of said bins from said shuttle while said shuttle transfers another bin into or out of said station.

* * * * *